United States Patent [19]
Parks

[11] 4,407,623
[45] Oct. 4, 1983

[54] LIFT ASSEMBLY INCLUDING A REACTION SWITCH

[75] Inventor: William W. Parks, Glenview, Ill.

[73] Assignee: Vapor Corporation, Chicago, Ill.

[21] Appl. No.: 200,594

[22] Filed: Oct. 24, 1980

[51] Int. Cl.[3] .................................... B60T 1/44

[52] U.S. Cl. ............................ 414/540; 192/129 A; 192/150; 280/166; 414/674; 414/921

[58] Field of Search ............... 414/539, 540, 545, 921, 414/674, 673; 187/40, 41, 9 R; 192/129 A, 129 B, 150; 91/419, 216 A, 217; 100/256, 53; 280/166; 105/447, 444, 445

[56] References Cited

U.S. PATENT DOCUMENTS 1,828,360 10/1931 Conklin ............................ 91/419
4,180,366 12/1979 Roth et al. ........................ 414/540

*Primary Examiner*—Bruce H. Stoner, Jr.
*Attorney, Agent, or Firm*—Francis J. Lidd

[57] ABSTRACT

A lift system for a transit vehicle includes a stationary main frame secured within a door recess of the vehicle and a side frame that is movable relative to the main frame. An articulated platform including steps pivotally secured to the side frame and scissor linkage pivotally and slideably connected to the main frame is also included. The lift system also includes a reaction switch coupled to the main frame to sense torque imparted to the main frame upon engagement of the platform with an obstacle such as a curb or the ground. If sufficient torque is created due to contact of the platform with an obstruction, the reaction switch is actuated to terminate further downward movement of the platform thereby preventing destruction of the system.

11 Claims, 3 Drawing Figures

LIFT ASSEMBLY INCLUDING A REACTION SWITCH

BACKGROUND OF THE INVENTION

1. Field of the Invention

The device of the present invention relates to a new and improved safety switch for a lift system that is employed for lifting wheel chairs or the like from ground level to floor level of a transit vehicle.

2. Description of the Prior Art

Many present day transit vehicles include a lift assembly or lift system mounted within a doorway recess of the vehicle that includes a platform that in a first position defines one or more steps and in a second, extended position defines a platform that can be lowered from the floor level of the transit vehicle to the ground whereupon a wheel chair may be rolled onto the platform. Thereafter, the reverse action of the platform allows the wheel chair to be rolled onto the floor or the transit vehicle. A lift system of this type is disclosed in U.S. Pat. No. 4,180,366 and this patent is incorporated by reference herein.

Prior art lift assemblies of this type include sensitive edges at different locations on the platform such that upon engagement of the platform with the ground or a curb, a sensitive edge actuates a switch to terminate further downward movement of the platform thereby avoiding damage to the lift assembly. It has been discovered that sensitive edges on these platforms have deteriorated rapidly due to the effects of the environment and the repeated engagement with the abrasive surfaces such as concrete curbs, sidewalks and the like. As a result of this deterioration of the sensitive dyes the reliability of the standard switch to terminate operation of the lift assembly upon engagement of the curb or sidewalk is reduced. Consequently, if the sensitive edge has sufficiently deteriorated the lift assembly will continue to operate after engagement with an obstacle resulting in substantial torsional forces being applied to the lift assembly causing damage to the frame and other components and possibly to the transit vehicle.

SUMMARY OF THE INVENTION

An object of the present invention is to provide a new and improved lift system for transit vehicles.

Another object of the present invention is to provide a new and improved device for deactivating the downward movement of a lift assembly on a transit vehicle upon engagement with an obstacle such as a curb or sidewalk.

A further object of the present invention is to provide a new and improved device for terminating the downward movement of a lift platform on a transit vehicle upon engagement with an obstacle wherein the device is located at a position on the assembly away from the detrimental effects of the environment.

The present invention is directed to an improvement to existing lift assemblies in transit vehicles and specifically to improvements in the switches employed for terminating the downward movement of a lift platform employed on transit vehicles. The lift assembly of the present invention includes a main frame that is secured within a recess of a doorway of a transit vehicle. A platform assembly that in a first position defines steps and a second position defines a planar platform is secured to the main frame and to a side frame thereof. Scissor linkage is also included and is slideably and pivotally connected to the main frame to allow the platform upon being actuated to be moved from the first position to the second position and thereafter to be moved downwardly until engagement with an obstacle such as a curb. Thereafter, a wheel chair or the like may be positioned thereon and the platform may be actuated to move to the floor level of the transit vehicle whereupon the wheel chair or the like may be moved into the transit vehicle.

The device of the present invention is a reaction switch secured to the main frame by means of bridging members that are held together by resilient members. Upon engagement of the platform with an obstacle such as a curb or the like, torsional forces are transmitted to the main frame. These torsional forces are imparted to the bridging members that in turn are moved away from each other against the bias of the resilient members to engage the reaction switch. The reaction switch then terminates the downward movement of platform thus preventing the damage to the lift assembly and to the transit vehicle. By placement of the reaction switch on the main frame, it is out of the detrimental effects of the environment and is less likely to be damaged.

BRIEF DESCRIPTION OF THE DRAWINGS

The above and other objects and advantages and novel features of the present invention will become apparent from the following detailed description of the preferred embodiment of the invention illustrated in the accompanying drawings wherein.

DESCRIPTION OF THE PREFERRED EMBODIMENT

Figure 1:
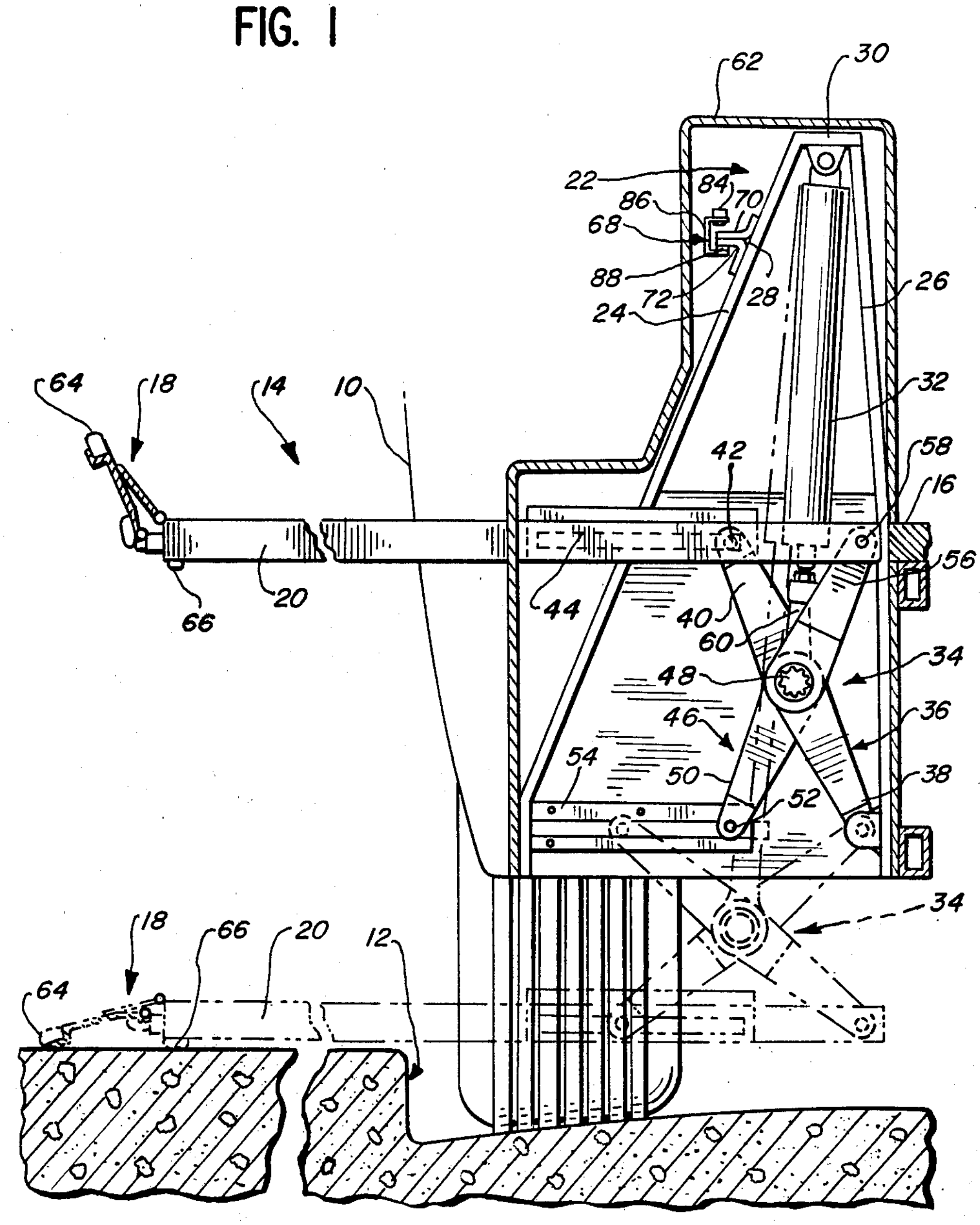
FIG. 1 is a cross-sectional view of a lift assembly incorporating the device of the present invention.

Before referring to the drawings herein it is to be understood that the device of the present invention is directed to a switch that prevents the destruction of a lift system on a transit vehicle. The particular type of lift system is not important since the device of the present invention may be used on several different types; however, for ease of understanding and to simplify the description of the present invention, the lift assembly set forth in U.S. Pat. No. 4,180,366 incorporated by reference herein will be used. Since the complete lift system is described in great detail in U.S. Pat. No. 4,180,366, only a brief description of the lift assembly will be described herein.

For an understanding of the lift system in general, reference is made to FIG. 1 wherein there is partially illustrated a transit vehicle 10 that is parked adjacent to a curb 12. The lift assembly is generally designated by the reference numeral 14 and is intended to be mounted within a doorway recess of the transit vehicle 10. The lift assembly 14 is intended to provide a device or platform for loading and unloading a handicapped person in a wheel chair and when not being so used, to be in a configuration useable as steps for non-handicapped riders.

FIG. 1 illustrates a lift assembly with the platform 14 in its extended position at the floor level 16 of the vehicle 10 in solid lines and at ground level in phantom lines. Briefly, the lift assembly 14 includes an end gate generally designated by the reference numeral 18 that is provided to prevent a wheel chair on the platform 20 from rolling off during the lifting operation. Once the platform 20 engages the curb 12, the end gate 18 is extended to the position illustrated in phantom lines in FIG. 1 to allow a wheel chair to be rolled over the end of the platform 20. The gate 18 serves to define a ramp from the ground level onto the platform 20.

Once a wheel chair is positioned on the platform 20 while the platform is on the curb, the lift assembly 14 may be actuated to elevate the platform to the floor level 16 of the transit vehicle 10 whereupon the wheel chair may be rolled onto the floor 16. To maintain the lift assembly 14 within the door recess of the transit vehicle 10 and to allow movement of the lift assembly therein, there is included stationary main frame members only one of which is shown in FIG. 1. The main frame 22 will be described herein although it is to be understood that identical components are included in the lift assembly 14 on the opposite side of main frame 22.

The main frame 22 is of a triangle configuration with two side supports 24 and 26. The side support 24 is continuous except for a separation or gap 28 defined therein. The side support 26 is continuous without interruption and is joined to the side support 24 by a top support 30. The main frame 22 is secured to the transit vehicle 10 within a door recess and is stationarily mounted thereto.

The main frame 22 includes a main lift cylinder 32 for raising and lowering the platform 20 in its extended position. The lift cylinder 32 is mechanically connected to the platform 20 by a scissor linkage generally designated by the reference numeral 34. The scissor linkage 34 includes a first, one-piece arm 36 that at a first end 38 is pivotally connected to the side support member 26 and a second end 40 that includes a pin 42 that is mounted within a slide 44 secured to a side frame (not shown) of the lift assembly 14. The scissor linkage 34 includes a second arm 46 that is joined to the first arm 36 by a spline connection 48. The second arm 46 includes a first end 50 that includes a pin 52 mounted in a slide 54 that is secured to the bottom of the main frame 22, thus, providing a sliding connection between the scissor linkage 34 and the main frame 22. The arm 46 includes a second end 56 that is secured to a torque bar 58 that is connected to the side frame (not shown). The spline connection 48 is connected to the main cylinder 32 through a lift yoke 60 thus allowing the scissor linkage 34 to be actuated under the influence of the lift cylinder 32 to raise and lower the lift platform 20. In order to protect passengers from contacting the various components of the lift assembly 14 that could result in harm, the main frame 22 and the rest of the components of the lift assembly 14 are covered by a cover 62.

If the downward movement of the platform 20 is not terminated upon engagement with the ground or the curb 12, damage will occur to lift assembly 14 due to the torsional forces created by the downward movement of the platform 20 imparted to the main frame 22. Accordingly, it is desired to terminate the downward movement upon engagement of the platform with the curb 12. To avoid damage, sensitive edges 64 and 66 are included on the gate member 18 and the lower edge of the platform 20. Sensitive edges 64 and 66 employ a contour rubber edge including a seal chamber at ambient air pressure. The chamber in the sensitive edges 64 and 66 are connected by short length of flexible tubing (not shown) to a pressure wave switch of high sensitivity (not shown). If an obstruction is encountered by either of the sensitive edges 64, 66, these edges will be momentarily deflected creating a pressure wave that is transmitted by way of the flexible tubing to the switch. The pressure wave deflects the switches' diaphragm momentarily closing an electrical contact and thus closing or disconnecting the control system of the lift assembly 14 to terminate the downward motion of the platform 20 and hold the platform 20 in that position.

It has occurred in actual use of lift assemblies of the type illustrated in the present invention that repeated engagement with the ground and the like has resulted in deterioration of the sensitive edges 64 and 66 with resultant reduction in reliability of operation of the lift assembly 14. Deterioration of the sensitive edges 64 and 66 has resulted in failure to terminate the downward movement of the platform 20 and the lift platform 20 functions to lift or jack up the bus by the lift assembly 14 and lift cylinder 32. The result often is damage to the main lift cylinder 32.

Figure 2:
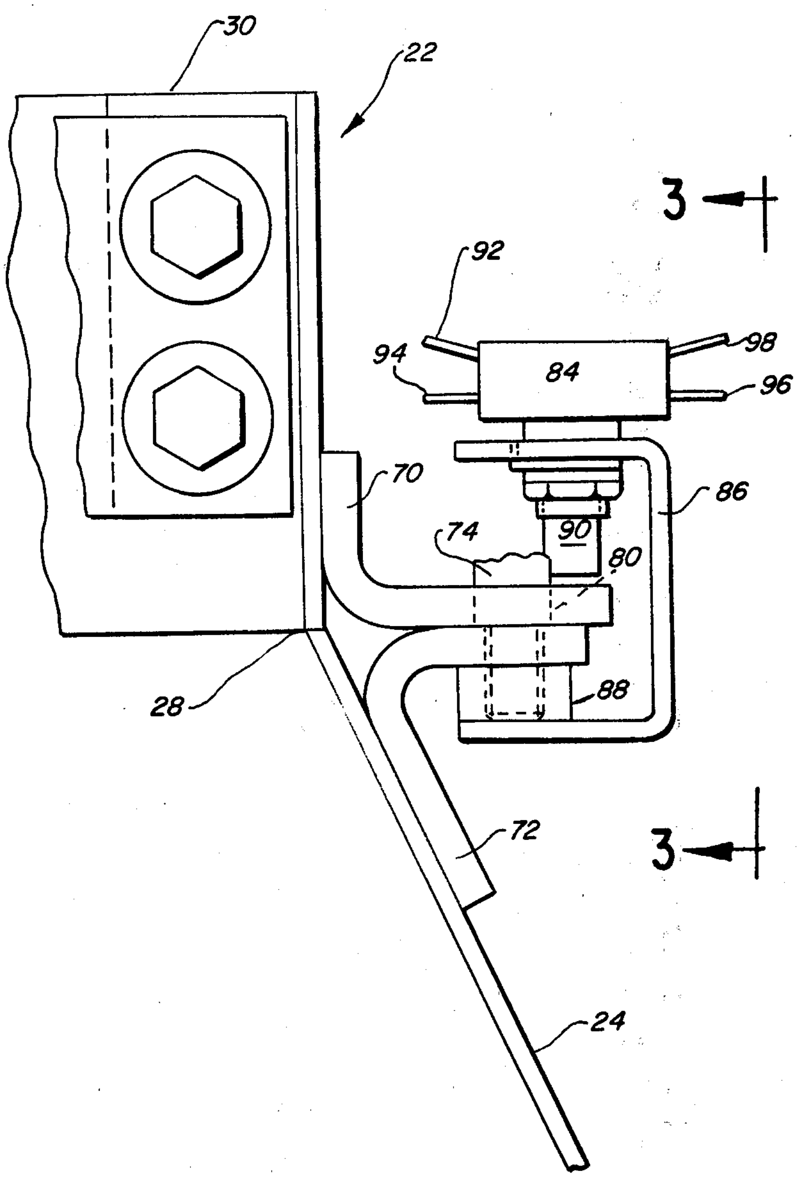
FIG. 2 is an enlarged partial view of the device of the present invention.
Figure 3:
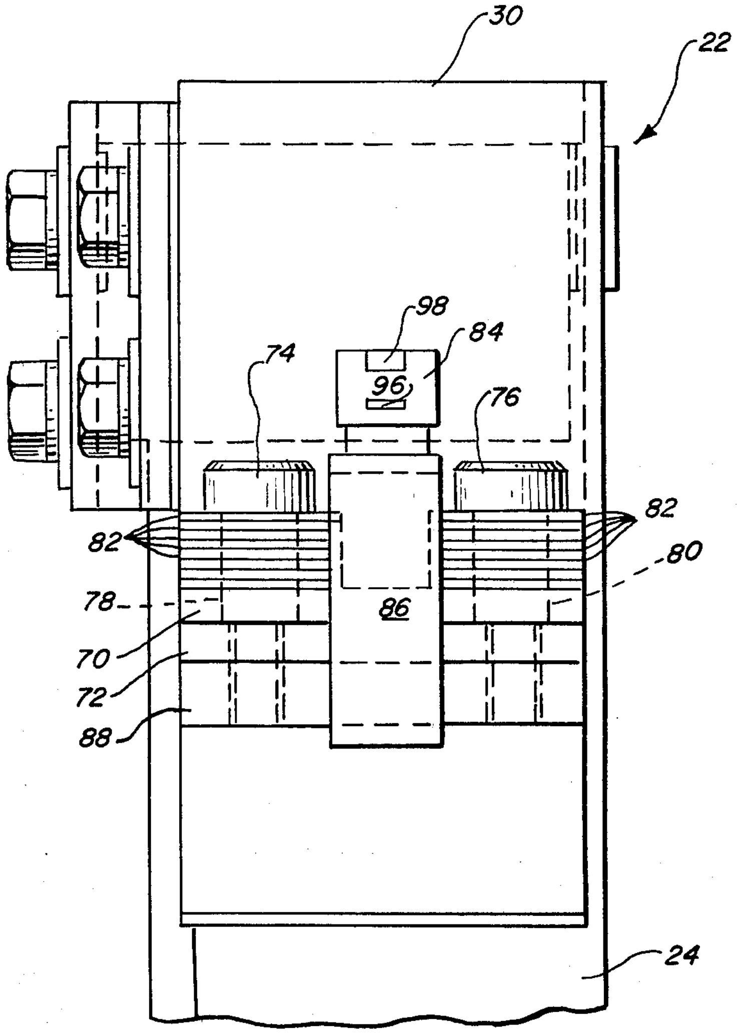
FIG. 3 is a view taken along line 3—3 of FIG. 2.

Accordingly, it is desirable to provide a switch that will terminate the downward movement of the platform 20 but will be located and actuated in a manner to avoid deterioration due to the environment. The device of the present invention overcomes this disadvantage. Specifically, a reaction switch generally designated by the reference numeral 68 is employed at a location within the cover 62 so as to be out of the detrimental effects of the environment. The reaction switch 68 includes a first bridging member or angle iron 70 that is secured to the side frame portion 24 at a location above the separation 28. A second bridging member or angle iron 72 is also secured to the side frame member 24 below the separation or gap 28. As best seen in FIGS. 2 and 3 the bridging members or angle irons 70 and 72 are biased together by first and second bolts 74 and 76 extending through apertures 78 and 80. A plurality of bellville washers 82 or the like are positioned between the heads of the bolts 74 and 76 and the upper surface of the angle iron or bridging member 70. This configuration serves to bias the angle irons 70 and 72 together across the gap or separation 28.

As can be understood by one skilled in the art, upon engagement of the platform 20 with the curb 12, if the downward movement of the platform is not immediately terminated, torsional forces are imparted through the platform 20, the mechanical coupling to the main frame 22 and across the gap 28. These torsional forces tend to separate the angle irons 70 and 72 from each other causing the angle iron 70 to move upwardly against the bias of the bellville washers 82 relative to the angle iron 72. The movement of the angle irons 70 and 72 directly reflects the engagement of the platform 20 with the curb 12 and can be used to signal the need for terminating the downward movement of the platform 20. To sense this movement of the angle iron 70 relative to the angle iron 72, a reaction switch 84 is mounted on a structural mount 86 that is secured to a mounting block 88. The block 88 is secured to the bolts 74 and 76 below the angle iron 72.

The reaction switch 84 includes a plunger 90 that extends below the reaction switch 84 to a location slightly above the angle iron 70. Thus, upon engagement of the platform 20 with the curb 12 or the like such that torsional forces are imparted to the main frame 22, the angle iron 70 moves upward relative to the angle iron 72. This upward movement causes engagement of the angle iron 70 with the plunger 90 thereby actuating the reaction switch 84. The reaction switch 84 is connected by terminals 92, 94, 96, and 98 with a control circuit that interrupts the flow of hydraulic fluid into the cylinder 32 resulting in limiting the force exerted by the platform 20 in its downward travel.

A feature of the arrangement of the reaction switch 84 and the angle irons or bridging members 70 and 72 is that this arrangement is positioned in an area distant from the ambient road conditions thus avoiding corrosion and subsequent degradation of the reliability of the assembly 14. Consequently, the reliability of this arrangement is substantially greater than the previous arrangement using only sensitive edges 64 and 66. Thus, the reaction switch 84 of the present invention may be used in cooperation with sensitive edges 64 and 66 as a backup protection assembly or the reaction switch 84 may be used alone without the need for sensitive edges 64 and 66.

What is claimed and desired to be secured by Letters Patent of the United States is:

1. In a lift assembly for a vehicle including a main frame secured to a doorway of said vehicle, means that in a first position defines steps and in a second position defines a lift platform, at least one linkage member secured to said means defining said lift platform and said steps, at least one side frame member to which said linkage member is pivotally connected, scissors linkage members pivotally and slideably connected to said main frame and said side frame member, the improvement comprising;

said main frame being separated in first and second sections, said first and second sections bridged by first and second bridging members, resilient means resiliently securing together said first and second bridging members, and switch means mounted on said first and second bridging members for deactivating said lift assembly upon engagement of said means defining said lift platform and said steps with a curb or the like.

2. The lift assembly claimed in claim 1 wherein said resilient means comprises a preloaded bolt extending between said first and second bridging members and a plurality of bellville washers mounted on said bolt.

3. The lift assembly claimed in claim 1 wherein said first and second bridging members comprise first and second angle irons.

4. The lift assembly claimed in claim 1 wherein said switch means comprises a reaction switch including a plunger engaging and actuated by said first bridging member.

5. The lift assembly claimed in claim 1, 2, 3, or 4 wherein said switch means is located away from said lift platform.

6. In a lift assembly for a vehicle including a lift platform defined by means defining steps in a first position and a lift platform in a second position, means for actuating said step means between said first and second positions, means for moving said platform from the floor level of said vehicle to ground level including a frame, the improvement comprising;

torque sensing means for sensing torque applied to said frame, said torque sensing means including a gap in said frame, at least one member mounted on said frame adjacent said gap, and reaction switch means for controlling said platform moving means, said reaction switch means mechanically coupled to said member to be actuated by the movement of said member in response to said torque applied to said frame.

7. The lift assembly set forth in claim 6 wherein two members are included, said members comprise first and second angle irons mounted on said frame.

8. The lift assembly set forth in claim 7 further comprising a plurality of bellville washers secured to said first and second angle irons to bias said first and second angle irons toward each other, and said reaction switch means including an actuating plunger engaged by one of said first and second angle irons upon movement away from each other of said first and second angle irons.

9. A device for sensing the engagement of a lift platform of a vehicle with an obstacle, wherein said lift platform includes a frame, and means for operating said lift platform, said device comprising a gap defined in said frame, first and second bridging members secured to said frame on opposite sides of said gap, means for resiliently biasing said first and second bridging members together across said gap, and switch means responsive to relative movement of said bridging members caused by said obstacle for deactuating said operating means.

10. The device defined in claim 9 wherein said biasing means comprises a plurality of bellville washers secured to said first and second bridging members.

11. The device defined in claim 9 wherein said switch means comprises a reaction switch secured to said first and second bridging means, said reaction switch includes a plunger engaging one of said first and second bridging members.

* * * * *